Jan. 27, 1942.  J. J. EGAN  2,271,419
VALVE CONSTRUCTION
Filed July 24, 1939  2 Sheets-Sheet 1
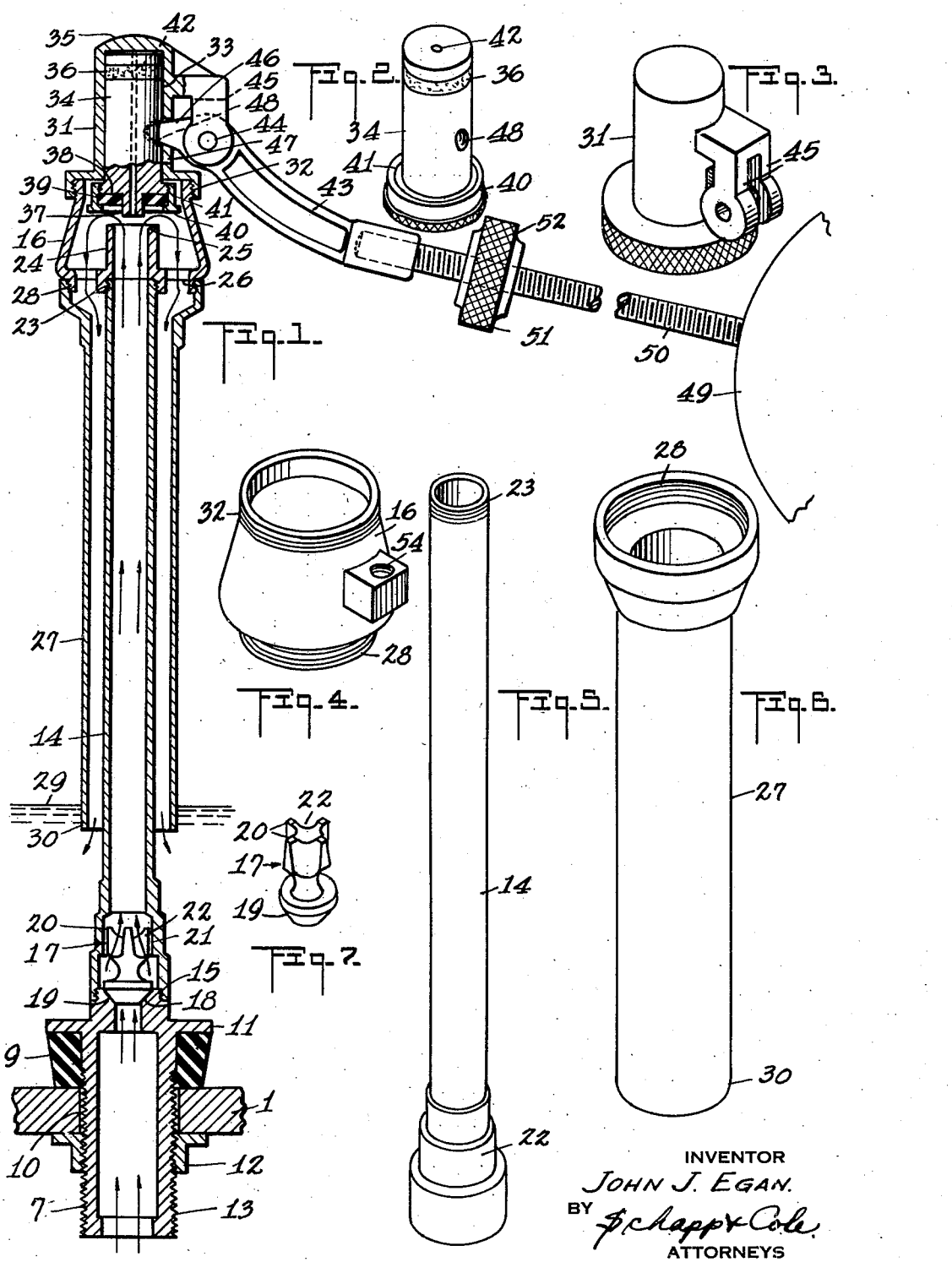
INVENTOR
JOHN J. EGAN.
BY Schapp & Cole
ATTORNEYS

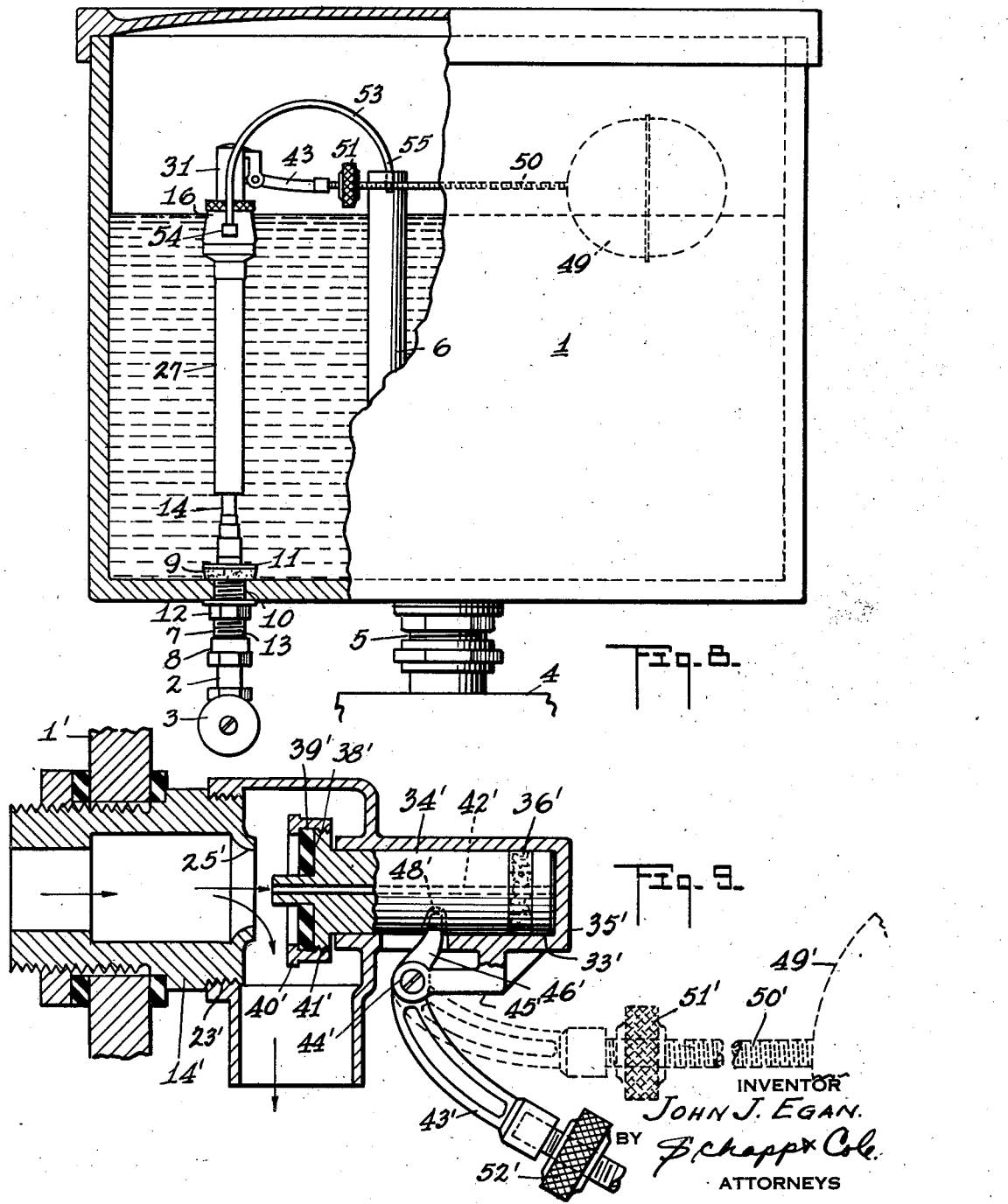

Patented Jan. 27, 1942

2,271,419

UNITED STATES PATENT OFFICE 2,271,419

VALVE CONSTRUCTION

John J. Egan, San Francisco, Calif., assignor of one-half to Earl M. Robitscher, San Francisco, Calif.

Application July 24, 1939, Serial No. 286,164

1 Claim. (Cl. 137—104)

The present invention relates to improvements in valve constructions, and has particular reference to a valve adapted for controlling the liquid supply to a tank or the like.

An object of my invention is to provide a valve that will automatically and positively close itself after a predetermined amount of liquid has passed into the tank.

A further object resides in the provision of a valve which will eliminate the usual hissing or chattering noise that is so often found in conventional valves, such as, for instance, the inlet vavles on flush tanks.

It is proposed to utilize the pressure of the incoming liquid for closing the valve and holding the latter upon its seat after a certain quantity of liquid has been discharged into a flush tank.

It is still further proposed to provide a valve of the character described, in which the pressure-responsive means for closing the valve may be adjusted to actuate the valve at different pressures and thus substantially the same amount of liquid may be discharged into the tank, regardless of the prevailing pressure in different pipe lines.

Moreover, I propose to utilize a float which acts in conjunction with the pressure-responsive means hereinabove referred to, the float being arranged to aid in the opening and closing of the valve relative to its seat.

A still further object of my invention is to provide a valve construction that is simple in construction, durable and efficient for the purposes intended and which may be manufactured at a relatively low cost.

Other objects and advantages of my invention will appear as the specification proceeds and the novel features will be particularly set forth in the appended claim.

For a better understanding of my invention, reference should be had to the accompanying drawings, forming part of this application, in which:

Figure 1 is a vertical sectional view taken through a valve construction embodying my invention, parts being shown in elevation;

Figures 2 to 7, inclusive, illustrate several parts of the valve in perspective view;

Figures 8 discloses a flush tank having one of my valves therein, part of the tank being shown in section; and Figure 9 illustrates a modified form of my valve in vertical section.

While I have shown only the preferred forms of my invention, I wish to have it understood that various changes or modifications may be made within the scope of the claim hereto attached without departing from the spirit of the invention.

In carrying my invention into practice, I make use of a conventional tank 1 having a liquid supply pipe 2 leading thereinto, the pipe being provided with a control valve 3.

It will be understood, of course, that the tank 1 may be made of any suitable size and shape insofar as the present invention is concerned. For the purpose of illustration only, I have shown the tank as forming part of the flushing system for a toilet 4. The latter is connected to the tank 1 by the usual pipe 5, which is provided with the conventional flush valve (not shown) in the well-known manner.

Flush toilets of this type are normally provided with an overflow tube 6, the latter discharging into the pipe 5 leading to the toilet.

Referring now to Figures 1 and 8, it will be noted that I provide the usual fitting 7, which passes downwardly through the bottom of the tank 1 and is connected to the supply pipe 2 by a suitable coupling 8. A gasket 9 forms a watertight connection over the opening 10 in the tank bottom. The flange 11 on the fitting 7 serves to force the gasket against the tank bottom when the nut 12 is tightened on the threaded portion 13 of the fitting.

An inlet tube 14 is threaded onto the top of the fitting 7, as at 15, and conveys the incoming liquid, such as water, to a bowl 16 mounted on the top of this inlet tube.

A foot-valve 17 coacts with a seat 18 formed on the upper end of the fitting 7 to prevent return flow through the tube 14.

Figures 1 and 7 illustrate the foot-valve 17 in detail, the lower part 19 of the valve being tapered to conform to the seat 18, while the upper part is fashioned with lateral wings 20. The wings 20 are guided by the section 21 of the inlet tube and the incoming liquid passes upwardly through the spaces 22 defined between the wings.

The bowl 16, previously mentioned, is threaded onto the top of the inlet tube 14, as at 23, and the incoming liquid flows upward through a riser 24, the latter being formed as part of the bowl and terminating at its top in a valve seat 25. The bottom of the bowl is formed with openings 26 through which the liquid is discharged. An apron or hush tube 27 is threaded onto the lower end of the bowl at 28. The tube 27 surrounds the inlet tube 14 and is spaced therefrom to allow the liquid to pass downwardly and finally into the tank 1.

The lowest level that the liquid, such as water, reaches in the tank after flushing of the toilet is indicated at 27 in Figure 1. It will be noted that the lower end 30 of the hush tube 27 is always immersed in the liquid or water and this acts to silence the inflow of the liquid into the tank.

The bowl 16 has a bonnet 31 threaded thereto, as at 32, the bonnet having a cylinder 33 formed therein in axial alinement with the inlet tube 14. The cylinder 33 extends upwardly from the bowl and has a plunger 34 slidably disposed therein, the top of the cylinder being closed at 35 (see Figure 1). A packing ring 36 is provided on the upper part of the plunger to form a liquid-tight seal between the latter and the cylinder.

The lower end of the plunger 34 has a reduced projection 37 and a shoulder 38 adjacent the projection. A washer 39 is telescoped over the projection 37 and is held against the shoulder 38 by a cap 40. The latter is threaded onto the plunger, as at 41.

A by-pass 42 extends axially through the plunger 34 from end to end and part of the incoming liquid is introduced between the closed end 35 of the cylinder and the upper end of the plunger by means of the by-pass. The liquid thus introduced into the top of the cylinder serves to urge the plunger downwardly and force the washer or valve 39 upon the seat 25.

It will be noted that liquid is continuously admitted into the upper part of the cylinder 33 and the valve 39 is held on its seat by the pressure of the incoming liquid. The outer diameter of the plunger somewhat exceeds the inner diameter of the inlet tube 14.

A lever 43 is pivoted at 44 to a bifurcated bracket 45 projecting from the bonnet 31. One arm 46 of this lever passes through a slot 47 in the bonnet and enters a socket 48 formed in the side of the plunger. The free end of the lever has a float 49 secured thereto.

It will be noted that as the water level in the tank 1 recedes, and the float 49 lowers, the weight of the float and the arm 50 of the lever serves to unseat the valve 39 from its seat 25. On the other hand, the raising of the float due to the filling of the tank, will aid the valve 39 in seating.

For adjusting the pressure-responsive means to actuate the valve 39 at different pressures of the incoming liquid, I provide a weighted element 51 that is adjustable along the length of the arm 50. It will be appreciated, of course, that the prevailing pressure in different pipe lines vary from each other. Substantially the same amount of water can be introduced into the tank for each flushing before the valve 39 is seated by merely moving the weighted element 51 along the lever arm.

The weighted element 51 has been illustrated in the drawings as a nut which is threaded onto the lever arm 50, the outer surface 52 of the nut, being knurled to facilitate adjustment thereof.

In order to maintain a quantity of water in the toilet 4, I make use of the conventional refill tube 53, one end of which is placed in communication with the bowl 16 at 54. The opposite end 55 discharges into the overflow tube 6.

The form of my invention as shown in Figure 9 is substantially the same as that illustrated in Figures 1 to 8, inclusive, and like numbers will be applied to corresponding parts, excepting the reference numerals will be primed.

In this modification, however, the inlet tube 14' extends through a vertical wall of the tank 1' and the cylinder 33' and the plunger 34' are horizontally disposed. The lever arm 43' is suitably curved to allow the valve to be mounted horizontally.

Having thus described the various parts of my valve construction, the operation thereof may be readily understood.

Assuming that the liquid has been discharged from the tank until its level has been lowered to the position indicated in Figure 1 and that valve 39 has unseated, as the water enters through the inlet tube 14, it passes upwardly and discharges over the riser 24 and into the bowl 16.

The water thus entering the bowl 16 flows downwardly through the openings 26 and passes through the space between the inlet tube 14 and the hush tube 27.

Part of the incoming water is by-passed at 42 into the top of the cylinder 33 and aids in urging the plunger downward.

As the level of the water rises in the tank 1, the float 49 is lifted by the water and aids in closing the valve 39 upon its seat 25 to stop the flow of the incoming water.

During the next time the water is discharged from the tank, the lowering of the float 50 will raise the valve 39 from the seat 25.

The float 49' in the modified form shown in Figure 9 may be made considerably smaller than the floats which operate the valves in large tanks, since the valve is urged closed not only by the float, but also by the pressure of the incoming liquid or water.

Although I have made reference to using my valve constructions in connection with flush tanks, it should be clearly understood that I do not wish to be limited in this respect, since my valves may be used in reservoirs, storage tanks and many other places.

I claim:

In a valve construction, an inlet tube adapted for connection to a source of liquid under pressure, a discharge tube surrounding the same in concentric relation, a riser secured to the upper end of the inlet tube and having an end forming a valve seat, a bowl-shaped member formed integral with the riser and surrounding the same to form a closed chamber therewith, a flange connecting the riser and the bowl and having outlet apertures for guiding liquid discharge through the riser into the discharge tube, the discharge tube being suspended from the bowl-shaped member, a bonnet secured to the upper end of the bowl-shaped member and having a cylindrical section alined with the intake pipe and having an aperture therein, a plunger movable in the said section and having a valve at its lower end to cooperate with the valve seat in closing the inlet pipe and having a recess therein opposite the aperture in the bonnet, the plunger having an axial perforation to allow liquid under pressure to bear on the end opposite the valve seat, a bracket projecting from the bonnet, a lever arm pivoted to the bracket and having an end extending through the aperture in the bonnet and engaging into the recess for operating the plunger, and a float at the other end of the lever arm, the plunger forming a closure for the aperture in the bonnet against liquid entering through the riser.

JOHN J. EGAN.